(12) United States Patent
Miyoshi (10) Patent No.: US 6,528,740 B2
(45) Date of Patent: Mar. 4, 2003

(54) POINTING DEVICE (75) Inventor: Toshiharu Miyoshi, Higashiosaka (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 09/799,813

(22) Filed: Mar. 7, 2001

(65) Prior Publication Data

US 2001/0030113 A1 Oct. 18, 2001

(30) Foreign Application Priority Data

Mar. 9, 2000 (JP) ........................................ 2000-064335

(51) Int. Cl.$^7$ ................................................. G09G 3/02
(52) U.S. Cl. .......................... 200/5 R; 200/18; 345/161
(58) Field of Search .......................... 200/4, 5 R, 6 R, 200/6 A, 17 R, 18, 332, 335; 74/347.12; 338/68, 128, 130–134; 345/161; 463/38

(56) References Cited

U.S. PATENT DOCUMENTS

| | | | | |
|---|---|---|---|---|
| 3,701,963 A | * | 10/1972 | Kasazima | ................... 338/128 |
| 5,019,677 A | * | 5/1991 | Menen | ........................ 338/131 |
| 5,293,158 A | * | 3/1994 | Soma | ......................... 345/161 |
| 5,327,162 A | * | 7/1994 | Soma | ......................... 345/161 |

\* cited by examiner

*Primary Examiner*—Michael Friedhofer
(74) *Attorney, Agent, or Firm*—Armstrong, Westerman & Hattori, LLP (57) ABSTRACT

The present invention avoids increase in a thickness of a pointing device for inputting a signal in X-Y directions by sliding operation, improves functions of the device, and reduces the number of parts. The present invention includes a case housing a set of moving bodies for moving linearly in X-Y directions as an operating body is slid. Below the moving bodies, a built-in substrate is housed. The moving bodies are respectively formed of plate-shaped metal portions and resin portions mounted to opposite sides of the moving bodies. The case is formed of an upper case made of resin and a lower case formed of a metal plate. Contacts for coming into sliding contact with the built-in substrate are mounted to the resin portions to form a volume. Springs for origin returning are housed in the resin portions. The operating body operates a press-down switch on the built-in substrate.

7 Claims, 10 Drawing Sheets

POINTING DEVICE

TECHNICAL FIELD

The present invention relates to a pointing device used for inputting a signal in X-Y directions in various electronic equipment such as a remote control unit, a game machine, a cellular phone, a PDA, and a notebook personal computer and more specifically to a pointing device of a sliding type in which an operating body is slid along a plate face of a mounting substrate.

PRIOR ART

A pointing device of a sliding type that is used as an input device of a signal in X-Y directions basically has a case fixed to a mounting substrate, a sliding-type operating body that is mounted to the case for inputting the signal in the X-Y directions and is slid in all directions around itself and along a surface of the substrate, a pair of moving bodies moving linearly in an X direction and a Y direction in the case as the operating body is slid, and a pair of signal output means for detecting moving positions of the pair of moving bodies and outputting electric signals in the X-Y directions.

As the signal output means, there is known means based on a magnetic sensor in addition to a volume. However, the means based on the magnetic sensor is large and expensive. Therefore, it is preferable in view of miniaturization and cost-reduction of the device to use signal output means formed of volume such as an X-Y direction input device disclosed in Japanese Patent Application Laid-open Publication No. 5-324187.

In the X-Y direction input device disclosed in Japanese Patent Application Laid-open Publication No. 5-324187, contacts are mounted to a pair of moving bodies housed in a case and each the contact comes into sliding contact with a resistor circuit on a surface of a special substrate housed in the case with the moving bodies, thereby forming the volumes in the case. The volumes in the case are connected to an electric circuit on a surface of a mounting substrate to which the case is fixed through a connector or by soldering.

Such a prior-art pointing device is smaller and less expensive than a device for which magnetic signal output means is used because the volumes are used as the signal output means. However, there is a problem of increase in a height of the device because the special substrate is provided in the case so as to form the volumes.

Although it is possible to operate a press-down switch by using the operating body so as to improve functions of the pointing device, the height of the device is further increased if the operation of the press-down switch is made possible.

The present invention has been accomplished with the above circumstances in view and it is an object of the present invention to provide a thin pointing device in which the height of the device can be suppressed even if the volumes as the signal output means are formed in the case and increase in the height of the device can be minimized even if the press-down switch can be operated by the operating body.

SUMMARY OF THE INVENTION

To achieve the above object, according to the present invention, there is provided a pointing device comprising a case fixed to a mounting substrate, a sliding-type operating body that is mounted to the case for inputting a signal in X-Y directions and is slid in all directions around itself and along a surface of the substrate, and a pair of moving bodies for moving linearly in X and Y directions in the case as the operating body is slid, wherein a metal plate is used for at least one of the pair of moving bodies.

In the pointing device according to the present invention, by using the metal plate for at least one of the pair of moving bodies, the height of the device can be suppressed even if the built-in substrate for forming the volume is housed in the case below the pair of moving bodies. Even if the operating body can move in a Z direction perpendicular to the X-Y directions and the press-down switch disposed below the operating body is operated by the operating body, increase in the height of the device can be minimized.

In order to reduce the thickness of the device, it is preferable that metal plates are used for both of the pair of moving bodies. It is also preferable that the case has a two-piece structure formed by mounting an upper case and a lower case to each other and that at least one of the upper case and the lower case is formed of a metal plate.

It is preferable that the press-down switch is formed of a switch circuit formed on an upper face of a built-in substrate and a resilient contact chip fixed onto the switch circuit so as to reduce the thickness.

It is preferable that the moving body for which the metal plate is used has a combined structure that is a combination of a plate-shaped metal portion extending in a direction perpendicular to a moving direction and resin portions in a pair respectively mounted to opposite end portions of the metal portion for movably retaining the metal portion in the case.

With this structure, it is possible to avoid contact between the electric circuit formed on the upper face of the built-in substrate and the metal portion. The resin portions can be used as sliders for forming the volumes and increase in the height of the device can be suppressed by mounting contacts for coming into sliding contact with the resistor circuit formed on the upper face of the built-in substrate to the lower faces of the resin portions or preferably to ceiling portions of recessed portions formed at the lower faces of the resin portions, for example. The resin portions can be used for origin returning mechanisms of the moving bodies and increase in the height of the device can be suppressed by housing the springs for origin returning between a top plate portion of the case and resin portions.

DETAILED DESCRIPTION OF THE INVENTION

Figure 1:
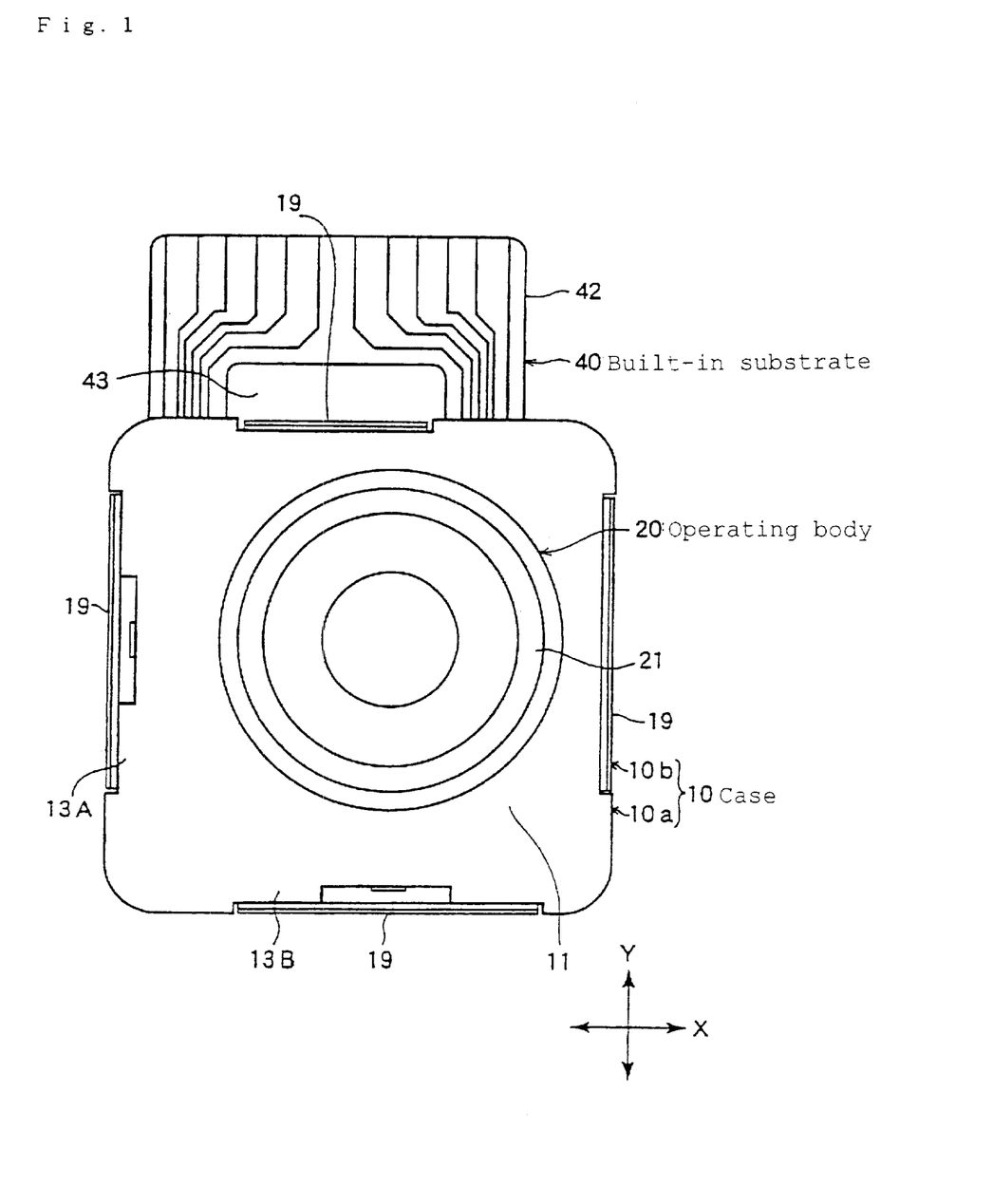
FIG. 1 is a plan view of a pointing device according to an embodiment of the present invention.
Figure 2:
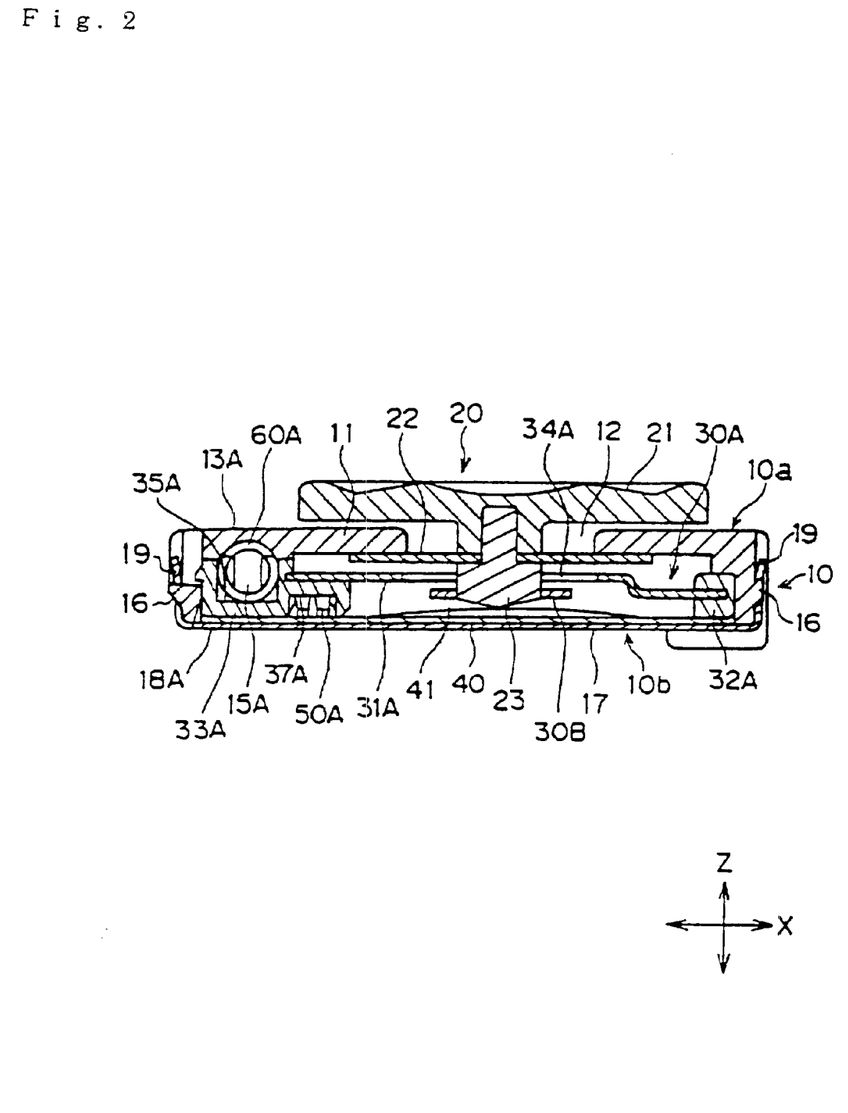
FIG. 2 is a vertical sectional front view of the pointing device.
Figure 3:
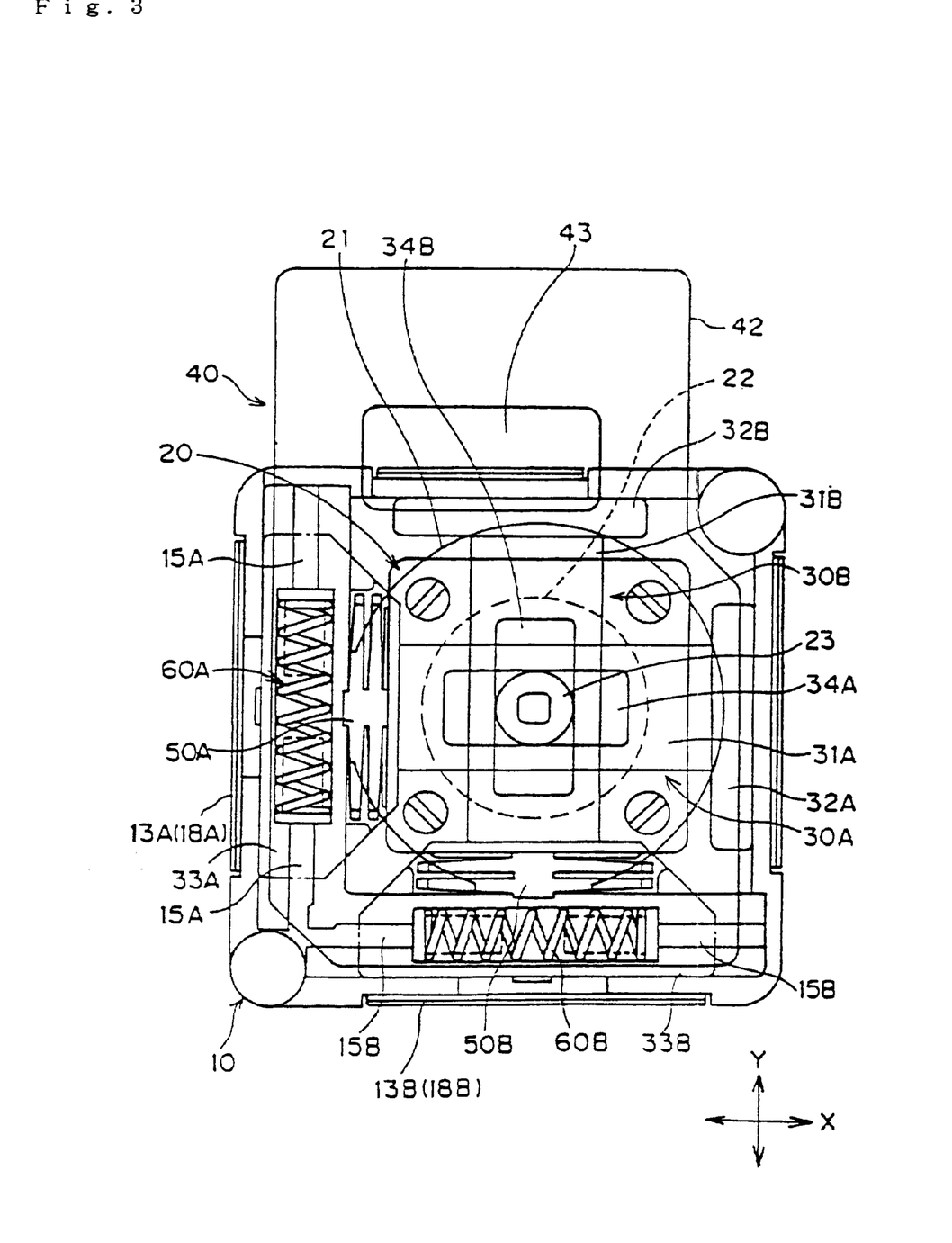
FIG. 3 is a perspective plan view of the pointing device.

An embodiment of the present invention will be described below based on the drawings. A pointing device described here includes, as shown in FIGS. 1 to 3, a case 10 fixed onto a mounting substrate, an operating body 20 of a sliding type that is mounted to the case 10 for inputting a signal in X-Y directions, a pair of upper and lower moving bodies 30A and 30B for moving linearly in X-Y directions in the case 10 as the operating body 20 is slid, a built-in substrate 40 housed in the case 10 for forming volume portions in the X-Y directions and a press-down switch in a Z direction perpendicular to the X-Y directions, contacts 50A and 50B in a set and respectively mounted to respective side end portions of the moving bodies 30A and 30B for forming the volume portions in the X-Y directions at two side portions orthogonal to each other of the case 10 with the built-in substrate 40, and a set of springs 60A and 60B mounted in the volume portions in the X-Y directions for automatically returning the moving bodies 30A and 30B to an origin position.

The moving body 30A and the contact 50A carry out signal input in a Y direction and the moving body 30B and the contact 50B carry out signal input in an X direction.

Figure 4:
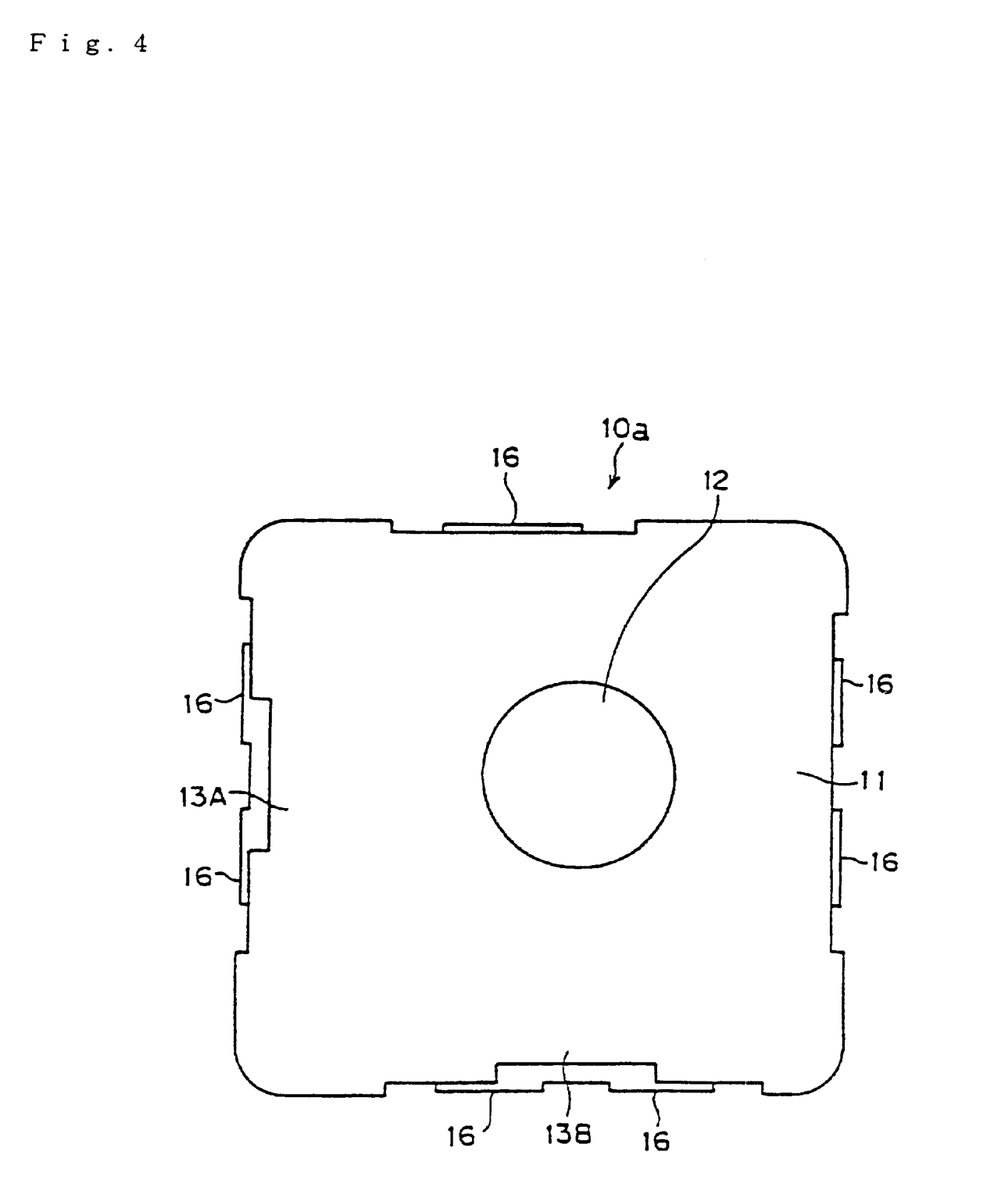
FIG. 4 is a plan view of an upper case used for the pointing device.
Figure 5:
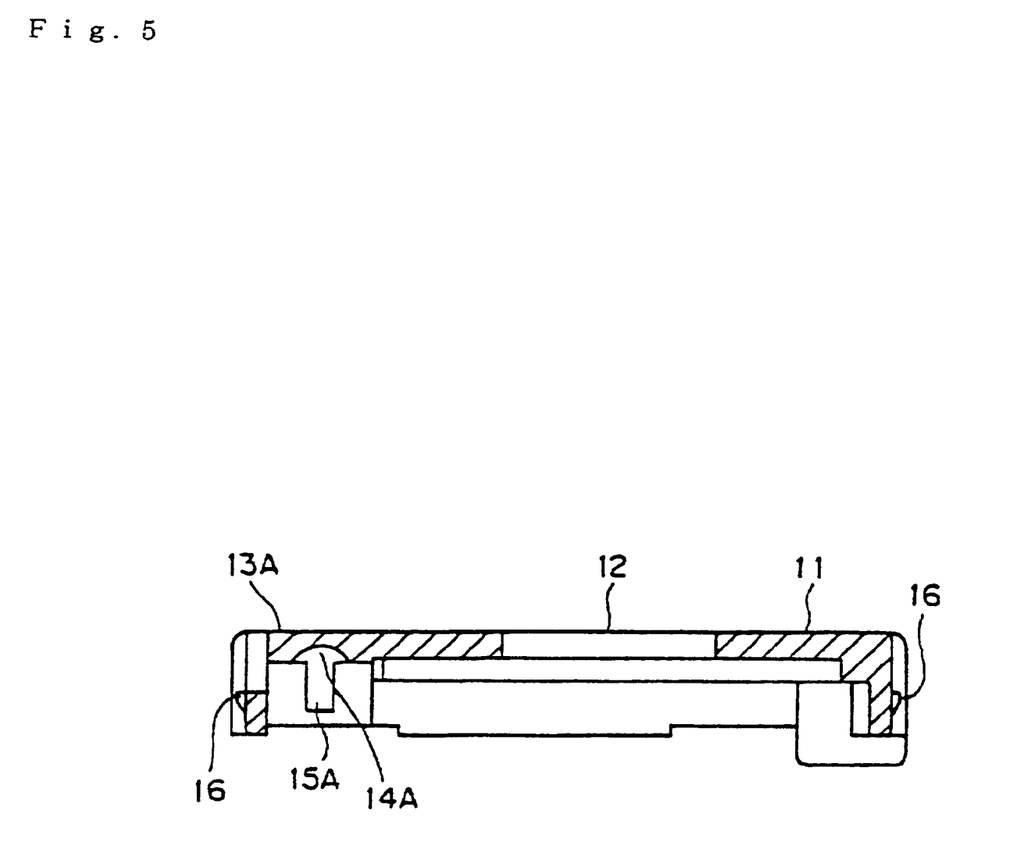
FIG. 5 is a vertical sectional front view of the upper case.
Figure 6:
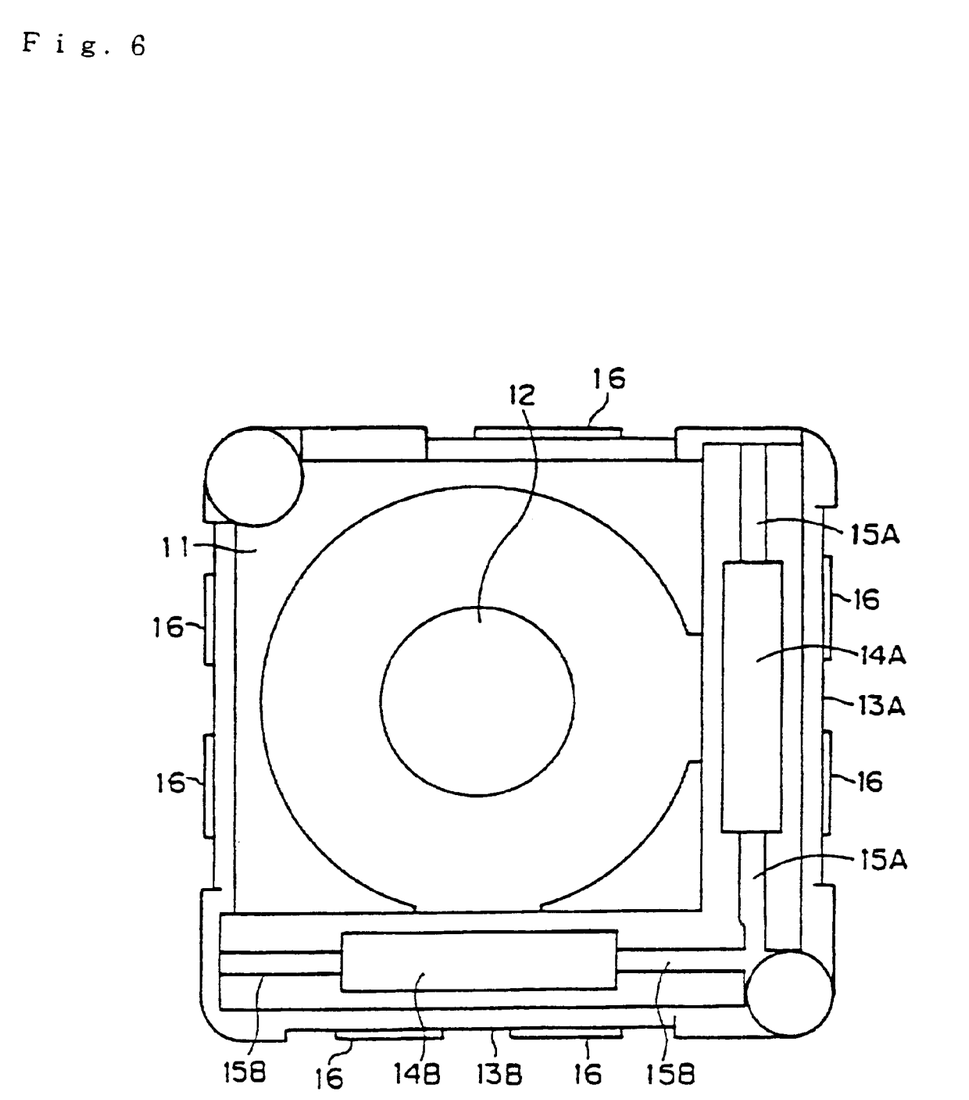
FIG. 6 is a bottom view of the upper case.

The case 10 has a two-piece structure in which an upper case 10a forming a top plate portion and a lower case 10b for forming a bottom plate portion are mounted to each other. The upper case 10a is a flat resin cap substantially in a square shape with an open lower face as shown in FIGS. 4 to 6. To a top plate portion 11 of the upper case 10a, a circular opening portion 12 through which a portion of the operating body 20 is caused to project upward is provided.

To two side portions orthogonal to each other of the top plate portion 11, overhanging portions 13A and 13B overhanging sideways with respect to the opening portion 12 are provided to form the volumes. Shallow recessed portions 14A, 14B in which the springs 60A and 60B are fitted are provided to the respective lower faces of the overhanging portions 13A and 13B along the respective sides. In order to compress the springs 60A and 60B in movement of the moving bodies 30A and 30B, restraining portions 15A, 15A and 15B, 15B of pairs formed of rib-shaped projections are positioned on opposite end sides of the recessed portions 14A and 14B.

Lug portions 16 through which the upper case 10a is connected to and fixed to the lower case 10b are provided to respective outer faces of four side wall portions of the upper case 10a.

Figure 7:
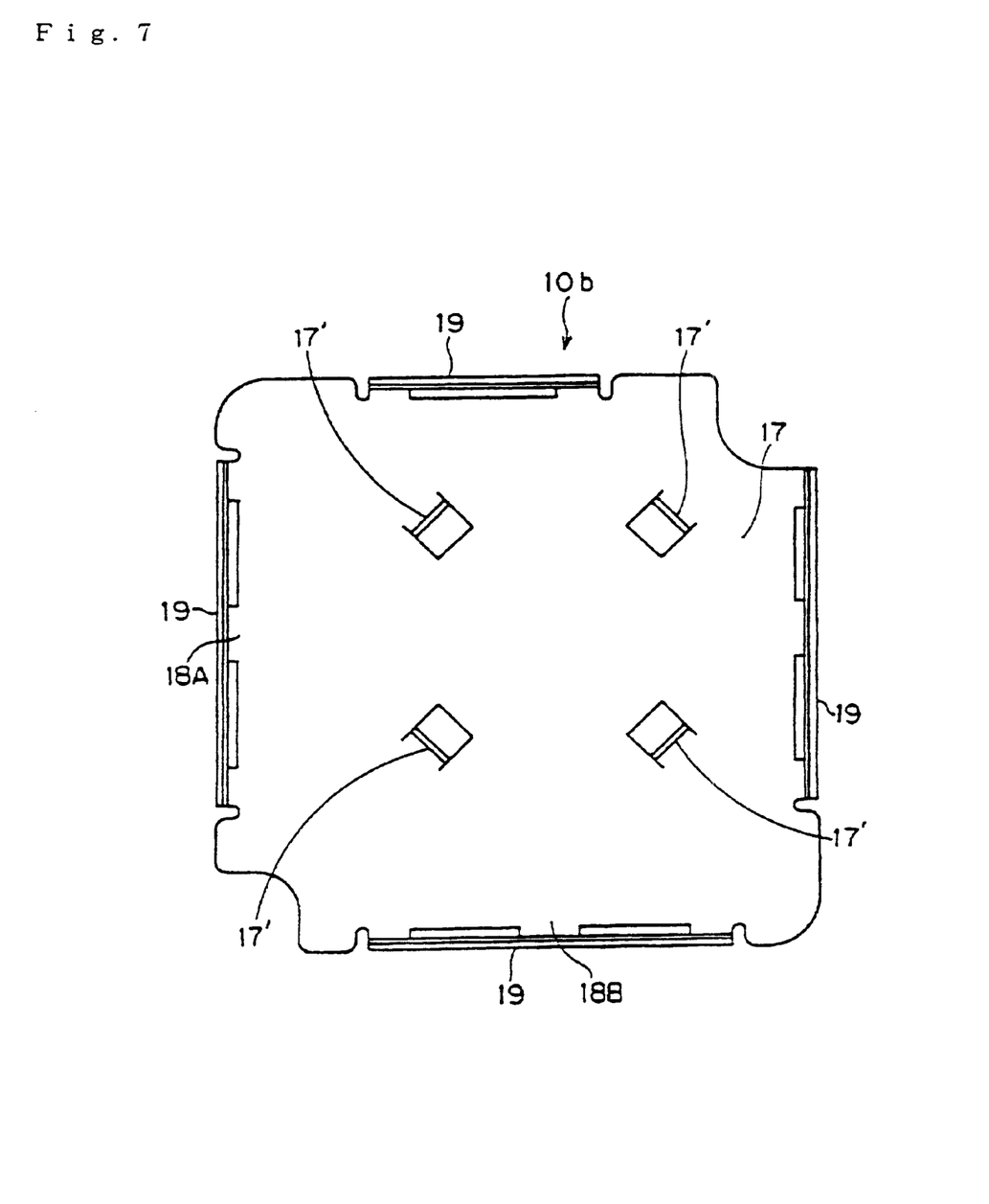
FIG. 7 is a plan view of a lower case used for the pointing device.
Figure 8:
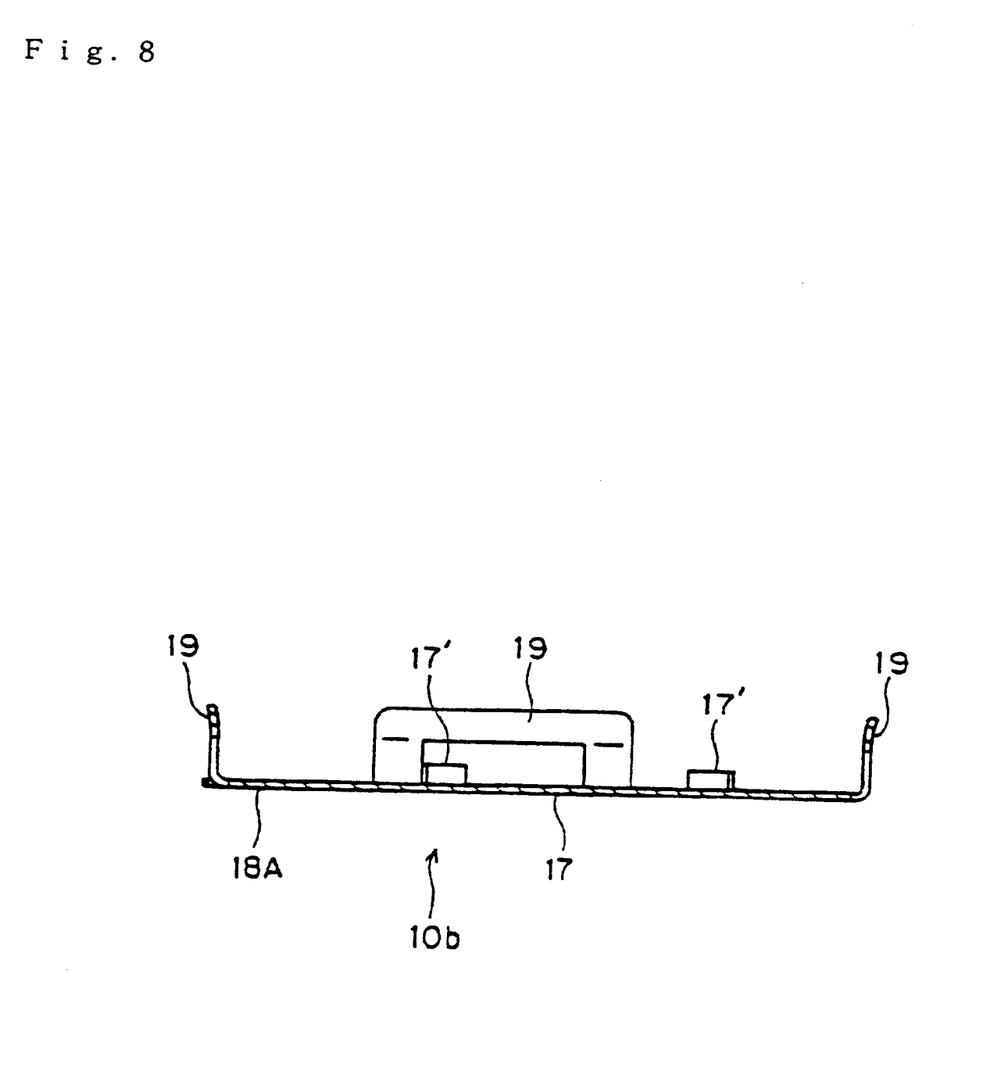
FIG. 8 is a vertical sectional front view of the lower case.

The lower case 10b is a product obtained by forming a metal plate as shown in FIGS. 7 and 8 and is fitted into and connected to the upper case 10a made of resin from below (see FIG. 2).

The bottom plate portion 17 of the lower case 10b is provided with a plurality of projections 17' for positioning the built-in substrate 40 onto the bottom plate portion 17. The projections 17' are formed by cutting and raising portions of the bottom plate portion 17 upward. To two side portions orthogonal to each other of the bottom plate portion 17, overhanging portions 18A and 18B corresponding to the overhanging portions 13A and 13B of the upper case 10a are provided. At four side portions of the bottom plate portion 17, fixing portions 19 to be engaged with the lug portions 16 of the upper case 10a are respectively formed by raising edge portions of the bottom plate portion 17 upward.

The operating body 20 has a disc-shaped operating portion 21, a coming-off preventing portion 22 mounted to a lower face of the operating portion 21, and a fixing portion 23 for fixing the coming-off preventing portion 22 as shown in FIGS. 1 and 2. The operating portion 21 projects further upward than the top plate portion 11 of the upper case 10a. The coming-off preventing portion 22 is formed of a metal plate and fixed to a central portion of a lower face of the operating portion 21 on a lower side of the top plate portion 11, thereby allowing movement of the operating body 20 in a Z direction and preventing upward coming-off of the operating body 20. The fixing portion 23 is fixed by press-fitting to a central portion of a lower face of the top plate portion 11 to retain the coming-off preventing portion 22 between the fixing portion 23 and the central portion of the lower face. The fixing portion 23 inserted in the case 10 also functions as the operating portion for operating the moving bodies 30A and 30B.

In the set of upper and lower moving bodies 30A and 30B, the moving body 30A in an upper stage carries out input of a signal in the Y direction and is movable only in the Y direction. The moving body 30B in a lower stage carries out input of a signal in the X direction and is movable only in the X direction. Both the moving bodies 30A and 30B are mounted to be perpendicular to each other and have substantially the same structures as each other. The structure will be described based on a case of the moving body 30B in the lower stage by reference to FIGS. 9 to 10.

Figure 9:
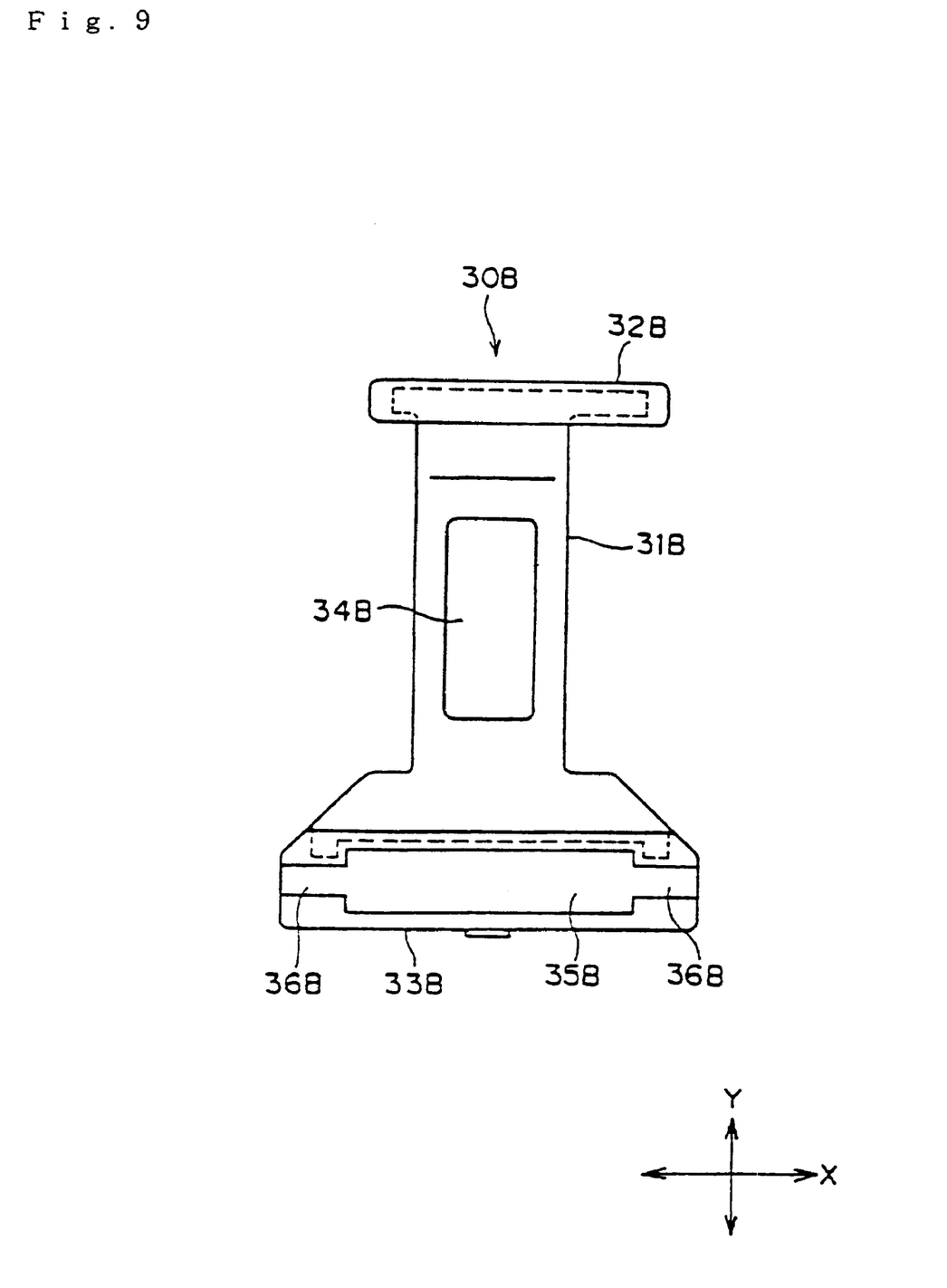
FIG. 9 is a plan view of a moving body in a lower stage used for the pointing device.
Figure 10:
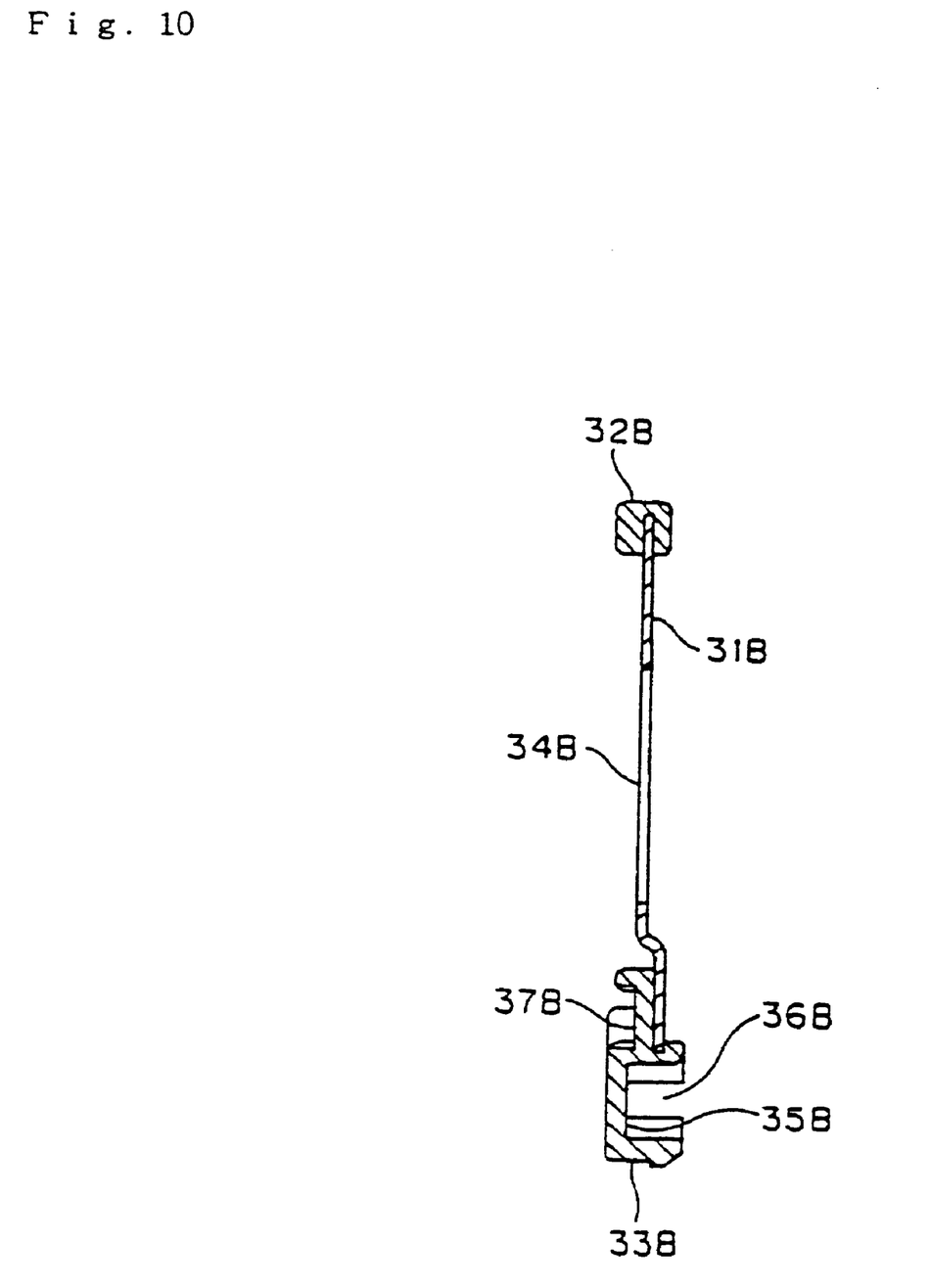
FIG. 10 is a vertical sectional side view of the moving body.

The moving body 30B in the lower stage is formed of a metal portion 31B made of a metal plate and resin portions 32B and 33B in a pair and respectively mounted to opposite end portions of the metal portion 31B. The metal portion 31B is substantially flat and extending in the Y direction perpendicular to the moving direction (X direction). The metal portion 31B is formed with a rectangular elongated hole 34B through which the fixing portion 23 of the operating body 20 passes. The elongated hole 34B extends to be long in the Y direction so as to allow relative movement of the operating body 20 in the Y direction. The opposite end portions in the Y direction of the metal portion 31B are molded with the resin portions 32B and 33B thereby being connected to the resin portions 32B and 33B.

The resin portions 32B and 33B in the pair are sliders for retaining the metal portion 31B in the case 10 and slide between the upper case 10a and the lower case 10b of the case 10 and, to be more precise, in the X direction along two parallel side portions on the built-in substrate 40 placed on the bottom plate portion 17 of the lower case 10b. The one resin portion 32B is purely a slider while the other resin portion 33B also functions as constituting members of the volume portion and an origin returning mechanism.

The resin portion 33B is disposed between the overhanging portion 13B of the upper case 10a and the overhanging portion 18B of the lower case 10b and, to be more precise, on an edge portion of the built-in substrate 40 placed on the bottom plate portion 17 of the lower case 10b. On an upper face of the resin portion 33B, a recessed first housing portion 35B for housing the spring 60B is formed to correspond to the recessed portion 14B formed at the lower face of the overhanging portion 13B. On opposite end sides of the first housing portion 35B, slit-shaped recessed portions 36B, 36B in a pair are respectively formed to be seamlessly connected to the first housing portion 35B. Restraining portions 15B, 15B provided to the lower face of the overhanging portion 13B are movably inserted into the recessed portions 36B, 36B.

On the other hand, on the lower face of the resin portion 33B, the second housing portion 37B for housing the contact 50B is formed. The second housing portion 37B is formed on inside of the first housing portion 35B such that the second housing portion 37B does not overlap the first housing portion 35B so as to prevent increase in a thickness of the resin portion 33B. The contact 50B is fixed downward to a ceiling face of the second housing portion 37B.

The moving body 30A in the upper stage is formed of a metal portion 31A formed of a metal plate and resin portions 32A and 33A in a pair and respectively mounted to opposite end portions of the metal portion 31A as shown in FIG. 2 and the resin portion 33A also functions as a constituting member of the volume portion and the origin returning mechanism.

Because the moving body 30A has substantially the same structure as the above moving body 30B in the lower stage except that the moving body 30A is disposed to be perpendicular to the moving body 30B in the lower stage and that the metal portion 31A is formed so as not to interfere with the metal portion 31B of the moving body 30B in the lower stage, corresponding portions are provided with the same reference numerals (with letters A) to omit descriptions of the portions.

The built-in substrate 40 is placed on the bottom plate portion 17 of the lower case 10b. Resistor circuits of a set for constituting the volume portions are formed on the upper faces of the two side portions orthogonal to each other of the built-in substrate 40 and the contacts 50A and 50B of the set come into resilient contact with the resistor circuits of the set from above. A switch circuit is formed and a dome-shaped resilient contact chip 41 that is called a snap plate is fixed by using tape to constitute a press-down switch on an upper face at a substantially central portion of the built-in substrate 40. The resilient contact chip 41 biases the operating body 20 upward and short-circuits the switch circuit below the resilient contact chip 41 when the resilient contact chip 41 is deformed downward.

A portion of the built-in substrate 40 projects as a terminal portion 42 to an outside of the case 10 (see FIGS. 1 and 3). At a base portion of the terminal portion 42, an opening portion 43 through which the side wall portion of the upper case 10a and the fixing portion 19 of the lower case 10b pass is formed.

In the set of springs 60A and 60B, one spring 60A is disposed between the overhanging portion 13A of the upper case 10a and the resin portion 33A of the moving body 30A and more specifically, housed in a slightly compressed state in a first housing portion 35A formed on the upper face of the resin portion 33A. The restraining portions 15A, 15A formed on the lower face of the overhanging portion 13A are in contact with the opposite end sides of the spring 60A.

Similarly, the other spring 60B is disposed between the overhanging portion 13B of the upper case 10a and the resin portion 33B of the moving body 30B and more specifically, housed in a slightly compressed state in a first housing portion 35B formed on the upper face of the resin portion 33B. The restraining portions 15B, 15B formed on the lower face of the overhanging portion 13B are in contact with the opposite end sides of the spring 60B.

Next, a function of the pointing device according to the embodiment of the present invention will be described.

When external force in X-Y directions is not applied to the operating body 20, the moving bodies 30A and 30B are resiliently retained in the origin positions by the springs 60A and 60B. As a result, the operating body 20 is also resiliently retained in the origin position. By biasing by the resilient contact chip 41, the operating body 20 is resiliently retained in an upper limit position (position where the coming-off preventing portion 22 comes into contact with the top plate portion 11 of the upper case 10a from below).

When the operating body 20 is operated in the X direction, the moving body 30B in the lower stage moves in the X direction. In response to this, the contact 50B slides on the corresponding resistor circuit on the built-in substrate 40. As a result, an electric signal corresponding to a moving amount in the X direction is output and input into the electronic equipment for which the device is used. As the moving body 30B moves, the spring 60B housed in the first housing portion 35B tries to move in an axial direction. However, because movement of the spring 60B is prevented by one of the restraining portions 15B, 15B formed on the lower face of the overhanging portion 13B of the upper case 10a, the spring 60B is pushed and compressed in the axial direction. Therefore, if the external force applied to the operating body 20 is removed, the moving body 30B automatically returns to the origin position and as a result, the operating body 20 also automatically returns to the origin position.

If the operating body 20 is operated in the Y direction, the moving body 30A in the upper stage moves in the Y direction. In response to this, the contact 50A slides on the corresponding resistor circuit on the built-in substrate 40. As a result, an electric signal corresponding to a moving amount is output and input into the electronic equipment for which the device is used. As the moving body 30A moves, the spring 60A moves in an axial direction. However, because movement of the spring 60A is prevented by one of the restraining portions 15A, 15A formed on the lower face of the overhanging portion 13A of the upper case 10a, the spring 60A is pushed and compressed in the axial direction. Therefore, if the external force applied to the operating body 20 is removed, the moving body 30A automatically returns to the origin position and as a result, the operating body 20 also automatically returns to the origin position.

By combination of the above operations, the electric signals corresponding to a moving direction in the X-Y directions and the moving amount of the operating body 20 are input into the electronic equipment for which the device is used.

If the operating body 20 is pushed downward against the biasing force of the resilient contact chip 41, the resilient contact chip 41 is deformed to short-circuits the switch circuit formed on the upper face of the built-in substrate 40 below the resilient contact chip 41, thereby obtaining a function as the press-down switch.

The volume portions as the signal output means are built in the two side portions orthogonal to each other of the case 10. Therefore, the number of parts is reduced as compared with a case in which external volumes are used. Especially because the resin portions 33A and 33B of the moving bodies 30A and 30B also function as constituting members of the volume portions and the origin returning mechanisms as well as the sliders, the number of the parts if extremely small. The built-in substrate 40 is used for both the volume portions and the press-down switch, which also reduces the number of parts.

Although the volume portions are housed with the built-in substrate 40 and the press-down switch is mounted in the case 10, a height of the device can be suppressed because the plate-shaped metal portions 31A and 31B are used for the moving bodies 30A and 30B and the lower case 10b is formed of the metal plate.

In other words, the pointing device according to the embodiment of the present invention is multifunctional and thin.

Because the spring 60A is housed in parallel between the overhanging portion 13A of the uppercase 10a and the resin portion 33A of the moving body 30A and the spring 60B is housed in parallel between the overhanging portion 13B of the upper case 10a and the resin portion 33B of the moving body 30B, increase in an external size of the device due to provision of the springs 60A and 60B can be minimized.

Although the housing portions for housing the springs 60A and 60B are formed on the upper faces of the resin portions 33A and 33B of the moving bodies 30A and 30B and the restraining portions for compressing the springs 60A and 60B in movement of the moving bodies 30A and 30B are formed on the lower faces of the overhanging portions 13A and 13B of the upper case 10a in the above embodiment, it is also possible that the housing portions for housing the springs 60A and 60B are formed on the lower faces of the overhanging portions 13A and 13B of the upper case 10a and that the restraining portions for compressing the springs 60A and 60B in movement of the moving bodies 30A and 30B are formed on the lower faces of the resin portions 33A and 33B of the moving bodies 30A and 30B.

It is also possible to form the origin returning mechanisms on the sides of each of the resin portions 32A and 32B of the springs 60A and 60B and to form the volume portions on the sides of the other resin portions 33A and 33B.

EFFECTS OF THE INVENTION

As described above, according to the pointing device of the present invention, by using the metal plates, the height of the device can be reduced even if the volumes as the signal output means are formed in the case and the increase in the height of the device can be minimized even if the press-down switch can be operated by the operating body. As a result, it is possible to design the multifunctional and thin device. By forming the volumes in the case, the number of the parts can be reduced.

What is claimed is:

1. A pointing device comprising:

a case;

a sliding-type operating body whose end portions are exposed outside said case and which moves in a horizontal direction for inputting a signal in X-Y directions; and a pair of moving bodies that are metal plates extending in a horizontal direction and for moving linearly in X and Y directions as said operating body is slid, said case contains a built-in substrate that is in contact with a lower portion of said moving plates and the substrate is formed with a resistance circuit on a surface thereof, and on the end portions of said moving plates are formed contacts that come into sliding contact with said resistance circuit, and by which a volume is formed by the contacts and resistance circuit.

2. The pointing device according to claim 1 wherein said case has a two-piece structure formed by mounting an upper case and a lower case to each other and at least one of said upper case and lower case is formed of a metal plate.

3. The pointing device according to claim 1 or 2, wherein said moving bodies for which said metal plates are used have plate-shaped metal portions extending in a direction perpendicular to a moving direction and resin portions in a pair respectively mounted to opposite end portions of said metal portions, wherein said resin portions retain the possibility for movement inside said case.

4. The pointing device according to claim 3, wherein said resin portions retain a contact for forming said volume on a lower face side.

5. The pointing device according to claim 3, wherein said moving bodies are resiliently retained in an origin position by springs for origin returning disposed between a top plate portion of said case and resin portions.

6. The pointing device according to claim 1, wherein said operating body can move in a Z direction perpendicular to said X-Y directions and operates a press-down switch disposed below said operating body.

7. The pointing device according to claim 6, wherein said press-down switch is formed of a switch circuit formed on an upper face of a built-in substrate and a resilient contact chip fixed onto said switch circuit.

* * * * *